US008446836B2

(12) United States Patent
Diab et al.

(10) Patent No.: US 8,446,836 B2
(45) Date of Patent: May 21, 2013

(54) METHOD AND SYSTEM FOR SUPPORTING A PLURALITY OF PROVIDERS VIA A SINGLE FEMTOCELL

(75) Inventors: Wael William Diab, San Francisco, CA (US); Charles Abraham, Los Gatos, CA (US); Xuemin Sherman Chen, Rancho Santa Fe, CA (US); Vinko Erceg, Cardiff, CA (US); Victor T. Hou, La Jolla, CA (US); Jeyhan Karaoguz, Irvine, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 96 days.

(21) Appl. No.: 12/395,383

(22) Filed: Feb. 27, 2009

(65) Prior Publication Data

US 2010/0220731 A1    Sep. 2, 2010

(51) Int. Cl.
    *H04W 4/00* (2009.01)
(52) U.S. Cl.
    USPC ............................ 370/252; 370/338; 370/467
(58) Field of Classification Search
    None
    See application file for complete search history.

(56) References Cited

U.S. PATENT DOCUMENTS

| 7,106,715 B1 | 9/2006 | Kelton | |
| 2002/0022483 A1* | 2/2002 | Thompson et al. | 455/439 |
| 2006/0052099 A1 | 3/2006 | Parker | |
| 2006/0209795 A1* | 9/2006 | Chow et al. | 370/352 |
| 2007/0121655 A1* | 5/2007 | Jin | 370/401 |
| 2008/0216145 A1 | 9/2008 | Barton et al. | |
| 2008/0244148 A1 | 10/2008 | Nix et al. | |
| 2009/0042536 A1* | 2/2009 | Bernard et al. | 455/406 |
| 2009/0059822 A1* | 3/2009 | Morrill et al. | 370/310 |
| 2009/0061873 A1 | 3/2009 | Bao et al. | |
| 2009/0092081 A1 | 4/2009 | Balasubramanian et al. | |
| 2009/0098858 A1 | 4/2009 | Gogic | |
| 2009/0164547 A1 | 6/2009 | Ch'ng | |

FOREIGN PATENT DOCUMENTS

| CN | 101060470 | 10/2007 |
| WO | WO 2006/123021 | 11/2006 |
| WO | WO 2008/005680 | 1/2008 |
| WO | WO 2009/021246 | 2/2009 |

OTHER PUBLICATIONS

Unpublished U.S. Appl. No. 12/391,009, filed Feb. 23, 2009.
Unpublished U.S. Appl. No. 12/395,470, filed Feb. 27, 2009.

(Continued)

*Primary Examiner* — Chirag G Shah
*Assistant Examiner* — Ashley Shivers
(74) *Attorney, Agent, or Firm* — Sterne, Kessler, Goldstein & Fox P.L.L.C.

(57) ABSTRACT

Aspects of a method and system for supporting a plurality of providers via a single femtocell are provided. In this regard, a femtocell may determine characteristics of one or more VLANs to which it is virtually communicatively coupled via a non-cellular connection and via a cellular connection. Based on the determined characteristics of the one or more VLANs, a cellular transmitter and/or receiver of the femtocell may be controlled to transmit and/or receive packets belonging to the one or more VLANs via the non-cellular connection and/or via the cellular connection. The characteristics of the one or more VLANs may comprise one or more of: cellular standards utilized by the one or more VLANs, cellular frequencies utilized in the one or more VLANs, access technologies utilized by the one or more VLANs, and a duplexing method utilized by the one or more VLANs.

22 Claims, 8 Drawing Sheets

U.S. PATENT DOCUMENTS

| | | |
|---|---|---|
| 2009/0279430 A1* | 11/2009 | Huber et al. ............... 370/230.1 |
| 2009/0288144 A1* | 11/2009 | Huber et al. ...................... 726/3 |
| 2009/0292799 A1 | 11/2009 | Eisener et al. |
| 2009/0316649 A1* | 12/2009 | Chen ............................. 370/331 |
| 2010/0167734 A1 | 7/2010 | Jones et al. |
| 2010/0182991 A1 | 7/2010 | Abraham et al. |
| 2010/0184411 A1 | 7/2010 | Chen et al. |
| 2010/0184414 A1 | 7/2010 | Abraham et al. |
| 2010/0184423 A1 | 7/2010 | Kent et al. |
| 2010/0184450 A1 | 7/2010 | Chen et al. |
| 2010/0186027 A1 | 7/2010 | Hou et al. |
| 2010/0210239 A1 | 8/2010 | Karaoguz et al. |
| 2010/0220642 A1 | 9/2010 | Abraham et al. |
| 2010/0220692 A1 | 9/2010 | Diab et al. |
| 2010/0220731 A1 | 9/2010 | Diab et al. |
| 2010/0222054 A1 | 9/2010 | Abraham et al. |
| 2010/0222069 A1 | 9/2010 | Abraham et al. |
| 2010/0238836 A1 | 9/2010 | Diab et al. |

OTHER PUBLICATIONS

Unpublished U.S. Appl. No. 12/395,410, filed Feb. 27, 2009.
Unpublished U.S. Appl. No. 12/395,383, filed Feb. 27, 2009.
Unpublished U.S. Appl. No. 12/395,313, filed Feb. 27, 2009.
Unpublished U.S. Appl. No. 12/395,436, filed Feb. 27, 2009.
Unpublished U.S. Appl. No. 12/406,835, filed Mar. 18, 2009.
European Search Report for European Patent Application No. EP 10001530.4, European Patent Office, Munich, Germany, dated Feb. 9, 2012, 9 pages.
English Language Abstract of CN 101060470, 1 page, Jul. 13, 2012.

* cited by examiner

METHOD AND SYSTEM FOR SUPPORTING A PLURALITY OF PROVIDERS VIA A SINGLE FEMTOCELL

CROSS-REFERENCE TO RELATED APPLICATIONS/INCORPORATION BY REFERENCE

Not Applicable.

FIELD OF THE INVENTION

Certain embodiments of the invention relate to networking. More specifically, certain embodiments of the invention relate to a method and system for supporting a plurality of providers via a single femtocell.

BACKGROUND OF THE INVENTION

A femtocell may be placed in a customer's residence or in a small business environment, for example. Femtocells may be utilized for off-loading macro radio network traffic, improving coverage locally in a cost-effective manner, and/or implementing home-zone services to increase revenue. Femtocells, like macro cell base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data traffic, for example.

An important characteristic of femtocells is their ability to control access. In an open access scenario, any terminal and/or subscriber may be allowed to communicate with the femtocell. Accordingly, the femtocell usage may somewhat resemble that of a macrocell system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a very low power in a controlled environment. It may be likely that they may not require a license from a local authority, as macrocell base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example. Interference between femtocells may be an issue for femtocell deployments based on wideband technologies such as WCDMA, for example, because initial operator deployments may use the same frequency for both the femtocell and the macrocell networks or due to the proximity of femtocell base stations in dense urban areas.

There are a plurality of design models for deployment and integration of femtocells, for example, an IP based Iu-b interface, a session initiation protocol (SIP) based approach using an Iu/A interface, use of unlicensed spectrum in a technique known as unlicensed mobile access (UMA) and/or use of IP multimedia subsystem (IMS) voice call continuity (VCC), for example.

In an Iu-b model based femtocell deployment approach, femtocells may be fully integrated into the wireless carrier's network and may be treated like any other remote node in a network. The Iu-b protocol may have a plurality of responsibilities, such as the management of common channels, common resources, and radio links along with configuration management, including cell configuration management, measurement handling and control, time division duplex (TDD) synchronization, and/or error reporting, for example. In Iu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for supporting a plurality of providers via a single femtocell, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for supporting a plurality of providers via a single femtocell. In various embodiments of the invention, a femtocell may determine characteristics of one or more VLANs to which it is virtually communicatively coupled via a non-cellular connection and via a cellular connection. Based on the determined characteristics of the one or more VLANs, a cellular transmitter and/or receiver of the femtocell may be configured and/or controlled to transmit and/or receive packets belonging to the one or more VLANs via the non-cellular connection and/or via the cellular connection. The femtocell may identify the one or more VLANs based on one or more VIDs recovered from packets processed in the femtocell. The characteristics of the one or more VLANs may comprise one or more of: cellular standards utilized by the one or more VLANs, cellular frequencies utilized in the one or more VLANs, access technologies utilized by the one or more VLANs, and a duplexing method utilized by the one or more VLANs. The one or more access technologies may comprise TDMA, FDMA, or CDMA, for example, and the duplexing methods may comprise TDD or FDD, for example. The femtocell may be operable receive one or more packets via the non-cellular connection, transcode the received packets based on the characteristics, and transmit the transcoded packets via the cellular transmitter and/or receiver. The femtocell may receive one or more packets via the cellular connection, transcode the received packets based on the characteristics, and transmit the transcoded packets via the non-cellular transmitter and/or receiver. The one or more VLANs may be nested to enable packets to traverse multiple VLANs. The cellular transmitter and/or receiver may be controlled, configured, and/or reconfigured dynamically to communicate in accordance with different cellular standards during different time intervals.

Figure 1:
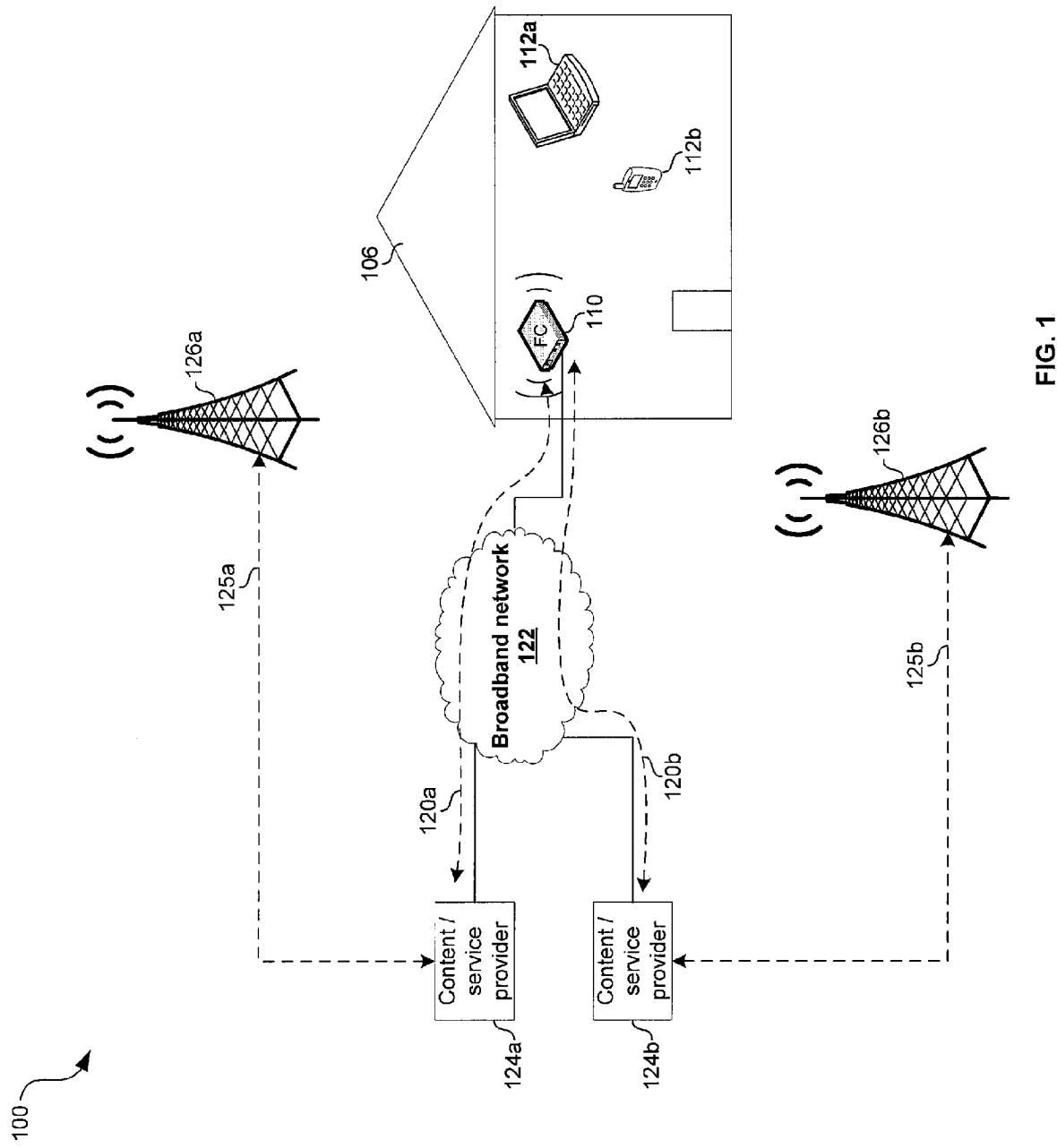
FIG. 1 is a diagram illustrating an exemplary communication cellular network, in accordance with an embodiment of the invention.

FIG. 1 is a diagram illustrating an exemplary communication network, in accordance with an embodiment of the invention. Referring to FIG. 1, there is shown a communication network 100 comprising base stations 126a and 126b, femtocell 110, cellular enabled communication devices 112a and 112b, and content and/or service providers 124a and 124b.

The content and/or service providers 124a and 124b may comprise suitable equipment comprising logic, circuitry and/or code that is operable to communicate multimedia and/or Internet content via the backhaul connections 125a and 125b, respectively, and via connections 120a and 120b, respectively. Multimedia and/or Internet content may comprise voice, audio and/or visual content comprising, video, still images, animated images, and/or textual content. The backhaul connections 125a and 15 and the connections 120a and 120b may each comprise one or more optical, wired, and/or wireless links. One or more of a variety of protocols, such as Ethernet, T1/E1, and DSL may be utilized for communicating data over the connections 120a and 120b. In an exemplary embodiment of the invention, the content and/or service providers 124a and 124b may provide cellular services. For example, content and/or service provider 124a may be a first cellular service provider that utilizes a first cellular standard to service the cellular enabled device 112a and the content and/or service provider 124b may be a second cellular service provider that utilizes a second cellular standard to service the cellular enabled device 112b.

The femtocell 110 may be installed in a property 106 which may comprise a commercial property, a residential property, or a multi-tenant property. A commercial property may comprise, for example, a store, restaurant, office, or municipal building. A residential property 106 may comprise, for example, a single-family home, a home office, and/or a townhouse. A Multi-tenant property 108 may comprise, for example, residential and/or commercial tenants such as apartments, condos, hotels, and/or high rises.

The broadband network 122, may comprise, for example, a satellite network, cable network, DVB network, the Internet, or similar local or wide area networks, which are capable of conveying data which may comprise, but is not limited to, voice, Internet data, and/or multimedia.

The base stations 126a and 126b may each be operable to communicate data wirelessly utilizing one or more cellular standards such as IS-95, CDMA, GSM, TDMA, GPRS, EDGE, UMTS/WCDMA, TD-SCDMA, HSDPA, extensions thereto, and/or variants thereof. Data comprises any analog and/or digital information including but not limited to voice, Internet data, and/or multimedia. Multimedia may comprise audio and/or visual content comprising, video, still images, animated images, and/or textual content. The stations 126a and 126b may communicate with cellular enabled communication devices such as the cellular enabled communication devices 112a and 112b. Exemplary cellular standards supported by the base stations 126a and 126b may be specified in the International Mobile Telecommunications-2000 (IMT-2000) standard and/or developed by the $3^{rd}$ generation partnership project (3GPP) and/or the $3^{rd}$ generation partnership project 2 (3GPP2). The base stations 126a and 126b may each be operable to communicate data wirelessly to cellular enabled communication devices such as the cellular enabled communication devices 112a and 112b. Additionally, the base stations 126a and 126b may be operable to communicate data to the backhaul connections 125a and 125b, respectively. Thus, data may be communicated between the base stations 126a and 126b and other portions of the network 100 and/or other networks via cellular and non-cellular connections. Exemplary networks with which data may be communicated may comprise public switched telephone networks (PSTN) and/or IP networks such as the Internet or an intranet.

The femtocell 110 may comprise suitable logic, circuitry, and/or code that may be operable to communicate wirelessly utilizing one or more cellular standards such as IS-95, CDMA, GSM, TDMA, GPRS, EDGE, UMTS/WCDMA, TD-SCDMA, HSDPA, extensions thereto, and/or variants thereof. In this regard, the femtocell 110 may be operable to communicate with cellular enabled communication devices such as the cellular enabled communication devices 112a and 112b. Exemplary cellular standards supported by the femtocell devices 110 may be specified in the International Mobile Telecommunications-2000 (IMT-2000) standard and/or developed by the 3$^{rd}$ generation partnership project (3GPP) and/or the 3$^{rd}$ generation partnership project 2 (3GPP2). Additionally, the femtocell 110 may comprise suitable logic, circuitry, and/or code that may be operable to communicate over a non-cellular network, which may be, for example, an IP based network.

In some embodiments of the invention, the femtocell 110 may be operable to perform one or more functions of a set-top-box. In this regard, the femtocell 110 may comprise suitable logic, circuitry, and/or code that may be operable to transmit and/or receive data via a multimedia network such as a satellite television network, a cable television network, and/or a digital video broadcast (DVB) network. Additionally, the femtocell 110, may comprise suitable logic, circuitry, and/or code that may be operable to encrypt, decrypt, compress, decompress, encode, decode, transcode, present, scramble, descramble, or otherwise process multimedia content. In this regard, the femtocell 110 may be operable to output multimedia content to one or more multimedia devices such as monitors, speakers, and/or storage devices.

The cellular enabled communication devices 112a and 112b may each comprise suitable logic, circuitry, and/or code that may be operable to communicate utilizing one or more cellular standards. In this regard, the cellular enabled communication devices 112a and 112b may each be operable to transmit and/or receive data via cellular connections to base stations, such as the base stations 126a and 126, and femtocells, such as the femtocell 110. Exemplary cellular enabled communication devices may comprise laptop computers, mobile phones, and personal media players. The cellular enabled communication devices 112a and 112b may be enabled to receive, process, and present multimedia content and may additionally be enabled run a web browser or other applications for providing Internet services to a user of the cellular enabled communication device communication device 112a and 112b.

In operation, the femtocell 110 may receive one or more packets from one or both of the service and/or content providers 124a and 124b. The femtocell 110 is operable to process the received packets to generate one or more corresponding cellular packets. The cellular packets may be generated and/or transmitted based on one or more virtual local area networks (VLANs) and/or virtual private networks (VPNs) to which the received packets belonged. The packets may originate from a content provider (CP) or service provider (SP) and may tunnel one or more other CP or SP networks in arriving at the femtocell 110. In this regard, L2 (data link layer of the OSI model) or L3 (Network or IP layer of the OSI model) tunneling. In this manner, the femtocell 110 may store and/or forward received data to one or both of the cellular enabled devices 112a and 112b. Similarly, the femtocell 110 may receive and/or store one or more cellular packets from one or both of the cellular enabled devices 112a and 112b via one or more cellular connections. The femtocell 110 may process the received cellular packets to generate one or more packets adhering to one or more protocols utilized by the connections 120a and/or 120b.

In an exemplary embodiment of the invention, the content and/or service provider 124a may, in many instances, communicate with cellular enabled communication devices via the base station 126a. However, the cellular enabled communication device 112a may not be able, or may not prefer, to communicate via the base station 126a. Consequently, when the cellular enabled communication device 112a is within range of the femtocell 110, then the content and/or service provider 124a may service the cellular enabled communication device 112a via the connection 120a. Similarly, the content and/or service provider 124b may, in many instances, communicate with cellular enabled communication devices via the base station 126b. However, the cellular enabled communication device 112b may not be able, or may not prefer, to communicate via the base station 126b. Consequently, when the cellular enabled communication device 112b is within range of the femtocell 110, then the content and/or service provider 124b may service the cellular enabled communication device 112b via the connection 120b. Thus, the femtocell 100 may support multiple cellular standards and may be dynamically controlled to support the different cellular standards at different times.

Furthermore, each of the content and/or service providers may be associated with one or more VIDs. Accordingly, based on one or more VIDs recovered from a packet, the femtocell 110 may identify characteristics of a VLAN to which the packet belongs and may control its cellular transmitter and/or receiver based on the characteristics. In this manner, packets may be transmitted and/or received in accordance standards and/or characteristics of the VLANs to which the packets belong. Exemplary characteristics of a VLAN which may be identified comprise a content and/or service provider associated with the VLAN, one or more cellular standards utilized in the VLAN, one or more cellular channels utilized in the VLAN, an access technology utilized in the VLANS, and/or a duplexing method utilizing in the VLAN.

Figure 2A:
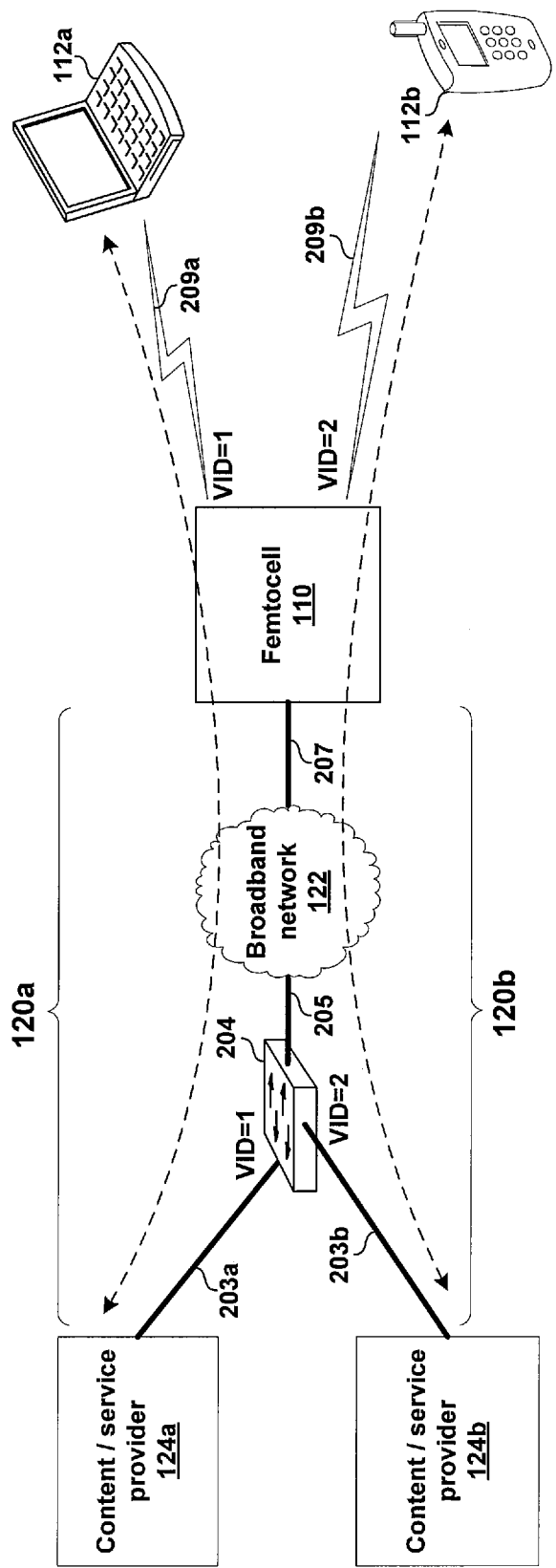
FIG. 2A is a diagram illustrating VLANs spanning a broadband interface and a cellular interface of a femtocell, in accordance with an embodiment of the invention.

FIG. 2A is a diagram illustrating VLANs spanning a broadband interface and a cellular interface of a femtocell, in accordance with an embodiment of the invention. Referring to FIG. 2A, the content and/or service providers 124a and 124b, the connections 120a and 120b, the femtocell 110, and the cellular enabled communication devices may be as described with respect to FIG. 1.

The connection 120a may comprise a network link 203a, network switch 204, and one or more additional links and/or network devices represented generically as the broadband network 122, and a link 207. Similarly, the connection 120b may comprise a network link 203b, network switch 204, one or more additional links and/or network devices represented generically as the broadband network 122, and the link 207.

The network switch 204 may comprise two or more network ports and may forward data received via one or more network ports to one or more other network ports. Additionally, the network switch 204 may comprise suitable logic, circuitry, and/or code that may be operable to forward data based on a VLAN to which the data belongs.

The cellular connections 209a and 209b may each be a cellular connection established in accordance with one or more cellular standards such as IS-95, CDMA, GSM, TDMA, GPRS, EDGE, UMTS/WCDMA, TD-SCDMA, HSDPA, extensions thereto, and/or variants thereof. In this regard, the connections 209a and 209b may be established utilizing code division multiple access (CDMA), time division multiple access (TDMA), and/or frequency division multiple access (FDMA) for supporting multiple user. Furthermore, the connections 209a and 209b may utilize time division duplexing (TDD) and/or frequency division duplexing (FDD) to manage uplink and downlink communications.

In the exemplary embodiment of the invention depicted, there is shown a first VLAN having a VLAN identifier (VID) of '1' and a second VLAN having a VID of '2'. In this regard, VLAN 1 comprises the content and/or service provider 202a and the cellular enabled communication devices 112a, and VLAN 2 comprises the content and/or service provider 202b and the cellular enabled communication device 112b.

In operation, the femtocell 110 may be operable to receive and/or store packets from one or both of the service and/or content providers 124a and 124b via the connections 120a and 120b, respectively. In this regard, packets comprising a VID of '1' may be communicated to the switch 204 via the network link 203a and data comprising a VID of '2' may be communicated to the switch 204 via the network link 203b. The switch 204 may then forward data for VLANs 1 and 2 onto the link 205 to the broadband network 122. The packets may traverse one or more nodes and/or links in the broadband network 122 and may ultimately be forwarded to the femtocell 110 via the link 207. The femtocell 110 may transcode or otherwise process the packets and forward the transcoded or otherwise processed packets to one or both of cellular enabled devices 112a and 112b, via the cellular connections 209a and 209b. The packets may be transcoded in accordance to one or more protocols, such as Ethernet at the data link layer and IP at the network layer, utilized by the connections 120a and 120b and one or more cellular protocols, such as GSM, or UMTS/WCDMA, utilized by the cellular connections 209a and 209b. Packets belonging to VLAN 1 may be transmitted via connection 209a and packets belonging to VLAN 2 may be transmitted via connection 209b. In this regard, the femtocell 110 may parse or otherwise process the packets to extract or reconstruct one or more VIDs associated with the received packets. In instances that some of the received packets are to be transmitted via connection 209a and some are to be transmitted via connection 209b, the femtocell 110 may reconfigure its cellular transmitter and/or receiver one or more times during transmission of the transcoded packets.

In the other direction, the femtocell 110 may receive packets from one or both of the cellular enabled devices 112a and 112b via the cellular connections 209a and 209b, respectively. In this regard, the femtocell 110 may reconfigure its cellular Tx/Rx one or more times to support reception of packets from two difference cellular connections which may have different characteristics. The femtocell 110 may forward the received packets onto the link 207 destined for the service and/or content provider 124a and/or the service and/or content provider 124b, depending on whether the data belongs to VLAN 1 and/or VLAN 2. In this regard, the femtocell 110 may parse or otherwise process the received packets to extract or reconstruct one or more VIDs associated with the received packets. Additionally, the ingress packets may be transcoded based on one or more cellular protocols, such as GSM, or UMTS/WCDMA, utilized by the cellular connections 209a and 209b and one or more protocols, such as Ethernet at the data link layer and IP at the network layer, utilized by the connections 120a and 120b.

In an exemplary embodiment of the invention, the broadband connections 120a and 120b may utilize Ethernet and/or Ethernet related protocols. Accordingly, the data may comprise one or more VLAN tags in accordance with IEEE 802.1Q. In other embodiments of the invention, rather than VLAN tagging at the data link layer, packets communicated between members of a VLAN may be uniquely marked at the network layer. For example, an IP packet may be uniquely marked to identify one or more VLANS to which the packet belongs. The IP packet may be uniquely marked via the header and/or the payload portion of the packet.

In various embodiments of the invention, VLAN 1 and/or VLAN 2 may utilize one or more security protocols to ensure that data belonging to one VLAN is not comprehensible to nodes which are not members of the VLAN. MACSec and IPsec are two suites of such security protocols.

Figure 2B:
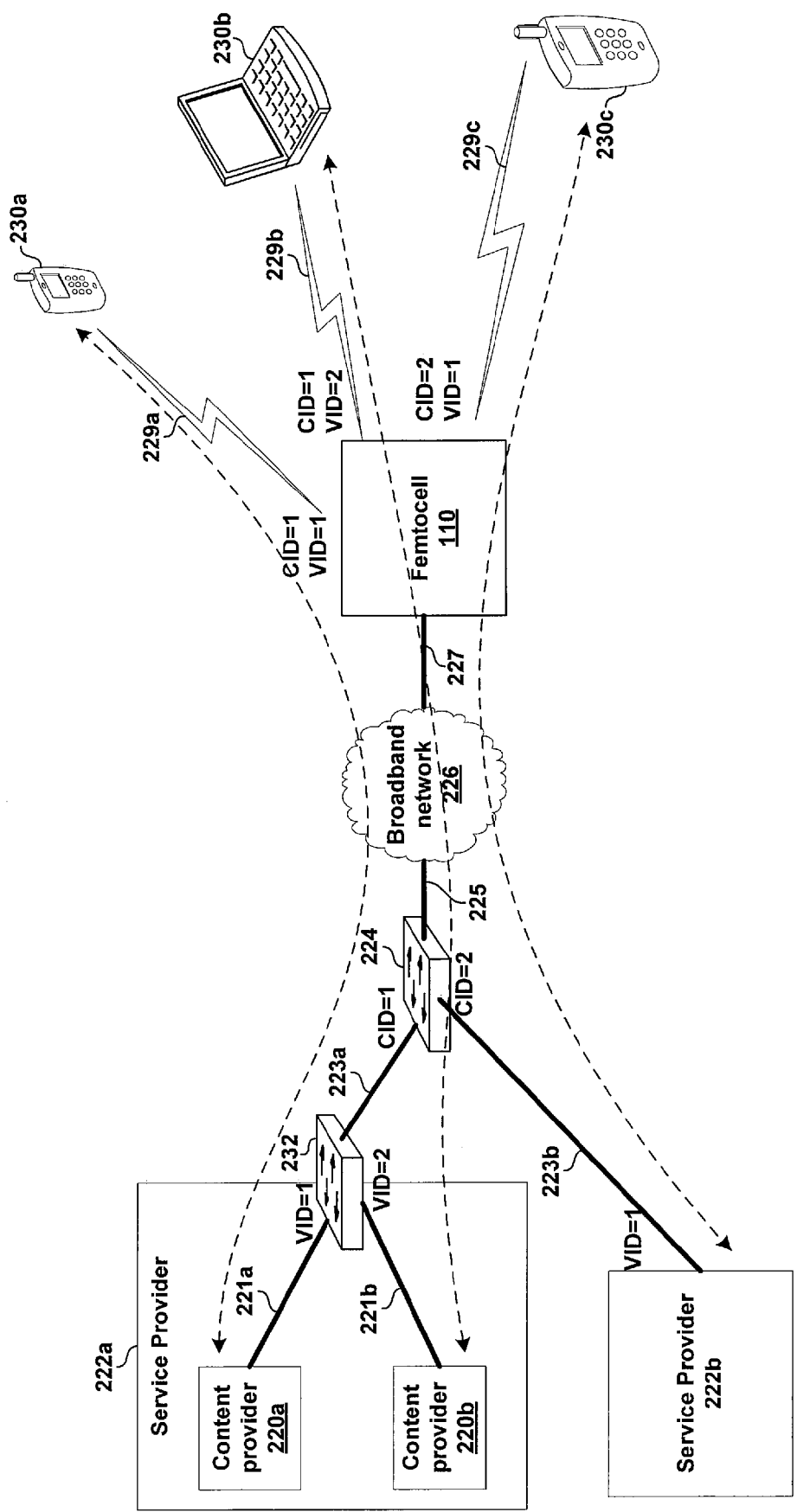
FIG. 2B is another diagram illustrating VLANs spanning a broadband interface and a cellular interface of a femtocell, in accordance with an embodiment of the invention.

FIG. 2B is another diagram illustrating VLANs spanning a broadband interface and a cellular interface of a femtocell, in accordance with an embodiment of the invention. Referring to FIG. 2B, there is shown service providers 222a and 222b, network switches 224 and 232, a broadband network 226, the femtocell 110, and cellular enabled communication devices 230a, 230b, and 230c.

The switch 232 may comprise suitable logic circuitry and/or code that may be operable to switch data from one or more ingress switch ports to one or more egress switch ports. The switch 232 may be an edge switch, that is, a switch located at a meeting or convergence point between two networks. In this regard, the switch 232 may couple an enterprise network of the service provider 222a to one or more other networks. The switch 232 may forward data between service provider 222a's enterprise network and the broadband network 226 for which the switch 224 may be an edge node. In this regard, the switch 224 may couple the broadband network 226 to one or more other networks. The switch 224 may receive data from, and communicate data to, service provider 222a via the link 223a and to the service provider 222b via the link 223b.

The service providers 222a and 222b may be substantially similar to the service and/or content providers 124a and 124b described with respect to FIGS. 1 and 2A. The service provider 222a may own, operate, house, content providers 220a and 220b. Alternatively, the service provider 222a may license content from the content providers 220a and 220b. In this regard, the content providers 220a and 220b may be assigned VIDs of '1' and '2' for the purposes of provider 222a's enterprise network. However, the service provider 222b may also be part of a VLAN with a VID of '1'. Accordingly, the switch 232 may need a way to distinguish the VLAN 1 of the service provider 222a and the VLAN 1 of the service provider 222b. Thus, nested VLANs may be utilized and the service providers 222a and 222b may be assigned customer identifiers (CID) '1' and '2', respectively; in effect establishing two additional VLANs. In an exemplary embodiment of the invention, one or more Ethernet links may be utilized in communicating data between the femtocell 228, the service providers 222a and 222b, and the content providers 220a and 220b, and this method of nested VLAN IDs may be referred to as VLAN "double tagging" or "QnQ." The Ethernet links may comprise megabit, multi-megabit, gigabit or multi-gigabit Ethernet links, such as 10 BASE-T, 100 BASE-T, 1 GBASE-T, and 10 GBASE-T.

Figure 2C:
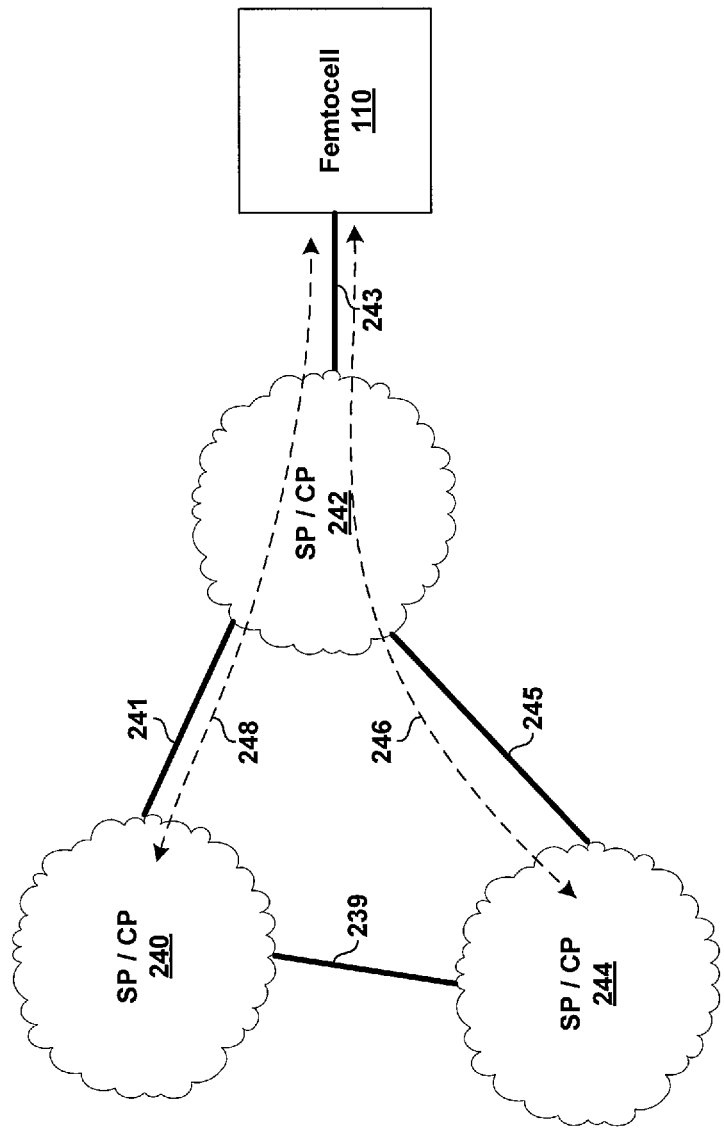
FIG. 2C is a diagram illustrating content tunneling across one or more networks en route to the femtocell 110, in accordance with an embodiment of the invention.

FIG. 2C is a diagram illustrating content tunneling across one or more networks en route to the femtocell 110, in accordance with an embodiment of the invention. Referring to FIG. 2C, although the service provider and/or content provider (SP/CP) 242 may own the network connection 243 to the femtocell 110, the femtocell 110 may desire to communicate with and receive data from the SP/CP 240 and/or the SP/CP 244. Accordingly, techniques such as virtual local area networking and virtual private networking may be utilized to tunnel content from the SCP/CP 240 and/or the SP/CP 244 over the network 242 and the connection 243 to the femtocell 110. In this regard, services may be provided to the femtocell 110 in a manner similar to a conventional phone network. That is, the SP/CP 242 may be comparable to a "local phone service provider" and SP/CP 240 and/or SP/CP 244 may be comparable to a "long distance provider."

In various embodiments of the invention, a policy in the femtocell 110 may determine the allocation of resources in the femtocell 110. For example, the SP/CP 242 may own and/or operate the connection 243 and/or the femtocell 110 and may accordingly, allocate resources of the femtocell 110, such as bandwidth, among the SP/CP 240 and the SP/CP 244.

Additionally, security levels and/or protocols implements by the femtocell 110 may be determined based on policies of the SP/CP 242. For example, traffic may be allowed to traverse the femtocell 110 or may be dropped by the femtocell 110 based on licensing agreements of the SP/CP 242, traffic types, and source and/or destination of the traffic.

Figure 3:
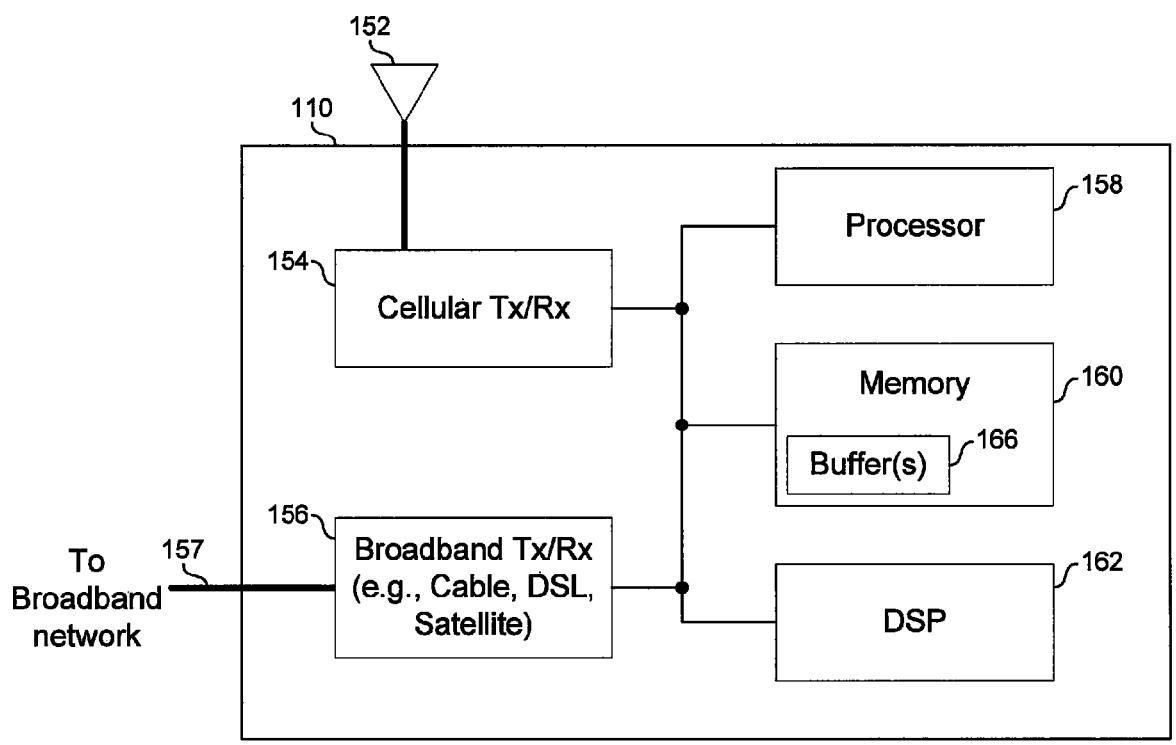
FIG. 3 is an exemplary block diagram of a femtocell, in accordance with an embodiment of the invention.

FIG. 3 is an exemplary block diagram of a femtocell, in accordance with an embodiment of the invention. Referring to FIG. 3, there is shown details of the exemplary femtocell 110 comprising an antenna 152, a cellular transmitter and/or receiver (Tx/Rx) 154, a broadband transmitter and/or receiver (Tx/Rx) 156, a processor 158, a memory 160, a digital signal processor (DSP) 162, and a network link 157.

The antenna 152 may be suitable for transmitting and/or receiving cellular signals. Although a single antenna is illustrated, the invention is not so limited. In this regard, the cellular Tx/Rx 154 may utilize a common antenna for transmission and reception, may utilize different antennas for transmission and reception, and/or may utilize a plurality of antennas for transmission and/or reception.

The cellular Tx/Rx 154 may comprise suitable logic circuitry and/or code that may be operable to transmit and/or receive voice and/or data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform amplification, up-conversion, filtering, modulation, and digital to analog conversion of transmitted cellular signals. The cellular Tx/Rx 154 may support communication over a plurality of communication channels utilizing time division multiple access (TDMA), frequency division multiple access (FDMA), and/or code division multiple access (CDMA). Exemplary cellular standards supported by the femtocell 110 may be specified in the International Mobile Telecommunications-2000 (IMT-2000) standard and/or developed by the $3^{rd}$ generation partnership project (3GPP) and/or the $3^{rd}$ generation partnership project 2 (3GPP2). In various embodiments of the invention, the femtocell 110 may comprise a plurality of cellular transmitters and/or receivers. In various embodiments of the invention, the cellular Tx/Rx 154 may be configured and/or controlled based to communicate based on a VLAN to which to be received and/or transmitted may belong. In various embodiments of the invention, the cellular Tx/Rx 154 may support multiple cellular protocols simultaneously, or seemingly simultaneously.

The broadband Tx/Rx 156 may comprise suitable logic, circuitry, and/or code that may be operable to transmit voice and/or data in adherence to one or more broadband standards. The broadband Tx/Rx 156 may be operable to perform amplification, down-conversion, filtering, demodulation, and analog to digital conversion of received signals. The broadband Tx/Rx 156 may be operable to perform amplification, up-conversion, filtering, modulation, and digital to analog conversion of transmitted signals. In various exemplary embodiments of the invention, the broadband Tx/Rx 156 may transmit and/or receive voice and/or data over the link 157 which may be a T1/E1 line, passive optical network (PON), DSL, cable television infrastructure, satellite broadband internet connection, satellite television infrastructure, and/or Ethernet.

The processor 158 may comprise suitable logic, circuitry, and/or code that may enable processing data and/or controlling operations of the femtocell 110. With regard to processing data, the processor 158 may enable packetization, de-packetization, transcoding, reformatting, and/or otherwise processing data received from and/or to be transmitted by the cellular Tx/Rx 154 and/or the broadband Tx/Rx 156. In this regard, the processor 158 may be operable to parse or otherwise inspect packets to determine one or more VLANs to which the packets belong. In some embodiments of the invention, the one or more VIDs may be recovered directly, or extracted, from the packets. In some embodiments of the invention, associated information, such as traversed IP addresses, may be recovered from the received packets and the associated information may be referenced to a database or similar data structure to determine the one or more VIDs.

With regard to controlling operations of the femtocell 110, the processor 158 may be enabled to provide control signals to the various other blocks comprising the femtocell 110. In this regard, the processor 158 may control the cellular Tx/Rx 154 based on one or more VLANs associated with data to be received and/or transmitted. The processor 158 may also control data transfers between various portions of the femtocell 110. Additionally, the processor 158 may enable execution of applications programs and/or code. In various embodiments of the invention, the applications, programs, and/or code may enable, for example, parsing, transcoding, determining path information for received packets, or otherwise processing data. In this regard, the processor 158 may be operable to transcode packets between formats suitable for the link 157 and formats suitable for transmission via a cellular connection. Moreover, VIDs may be carried over from the original format to the transcoded format and/or corresponding VLAN identifiers, compatible with the transcoded format, may be generated and/or retrieved from memory. Additionally, the applications, programs, and/or code may enable, for example, configuring or controlling operation of the cellular Tx/Rx 154, the broadband Tx/Rx 156, the DSP 162, and/or the memory 160.

The memory 160 may comprise suitable logic, circuitry, and/or code that may enable storage or programming of information that includes parameters and/or code that may effectuate the operation of the femtocell 110. The parameters may comprise configuration data and the code may comprise operational code such as software and/or firmware, but the information need not be limited in this regard. Moreover, the parameters may include adaptive filter and/or block coefficients. Additionally, the memory 160 may comprise one or more buffers 166 for storing packets received via the cellular Tx/Rx 154 and/or the broadband Tx/Rx 156 and/or packets to be transmitted via the cellular Tx/Rx 154 and/or the broadband Tx/Rx 156. Thus, the memory 160 may enable packetization, de-packetization, transcoding, reformatting, and/or otherwise processing data received from and/or to be transmitted by the cellular Tx/Rx 154 and/or from the broadband Tx/Rx 156.

The DSP 162 may comprise suitable logic, circuitry, and/or code operable to perform computationally intensive processing of data. In various embodiments of the invention, the DSP 162 may encode, decode, modulate, demodulate, encrypt, decrypt, scramble, descramble, and/or otherwise process data. In various embodiments of the invention, the DSP 162 may be enabled adjust a modulation scheme, error coding scheme, and/or data rates of transmitted cellular signals data. In various embodiments of the invention, processing of signals by the DSP may be controlled and/or configured based on one or more VLANs to which received data and/or data to be transmitted may belong.

In operation, the femtocell 110 may be operable to receive one or more packets via a first of the cellular Tx/Rx 154 and the broadband Tx/Rx 156 and transmit a one or more corresponding packets via the other of the cellular Tx/Rx 154 and the broadband Tx/Rx 156. The received packets may belong to one or more VLANs and the format of the received packets may depend on characteristics of the one or more VLANs to which the packets belong. Accordingly, the femtocell 110 may be enabled to recover one or more VIDs from the received packets, determine characteristics of the corresponding VLAN, and process the received packets accordingly. Similarly, the format of packets to be transmitted by the cellular Tx/Rx 154 and/or from the broadband Tx/Rx 156 may vary depending on characteristics of the one or more VLANs to which they belong. Thus, data may be received via one of the cellular Tx/Rx 154 or the broadband Tx/Rx 156, transcoded, and the transcoded data may be transmitted via the other of the Cellular Tx/Rx 154 and the broadband Tx/Rx 156.

In various exemplary embodiments of the invention, received data may be conveyed to the processor 158 and/or the memory 160. The processor 158, utilizing the memory 160, may reassemble the data into packets and then may begin processing the packets. In this regard, the processor 158, utilizing the memory 160, may parse and/or de-packetize the packets to recover the data contained therein and to recover any VIDs therein. The VID may be referenced to a look-up table, or similar data structure in the memory 160, to determine characteristics of the associated VLAN. The processor 158, the memory 160, and/or the DSP 162 may process the received packets to generate one or more corresponding packets to be transmitted to one or more members of the VLAN communicatively coupled to the cellular Tx/Rx 154 and/or the broadband Tx/Rx 156.

In various embodiments of the invention, the femtocell 110 may support multiple cellular service providers which may utilize different cellular standards and/or protocols. For example, the femtocell 110 and/or the cellular service providers may utilize one or more exemplary 2G, 2.5G, 3G, 4G technologies or protocols comprising GSM, GPRS, EDGE, CDMA, CDMA2000, WCDMA, EVDO, HSUPA, HSDPA, WiMAX, and UMTS. Accordingly, the cellular Tx/Rx 154 may be configured based on a cellular service provider of a cellular enabled communication device from which a packet arrived or to which a packet is to be transmitted. In this regard, a source cellular enabled communication device may be determined by one or more VIDs in a packet received from the source cellular enabled communication device. Similarly, a destination cellular enabled communication device may be determined by one or more VIDs in a generated corresponding packet to be transmitted to the destination cellular enabled communication device.

Figure 4A:
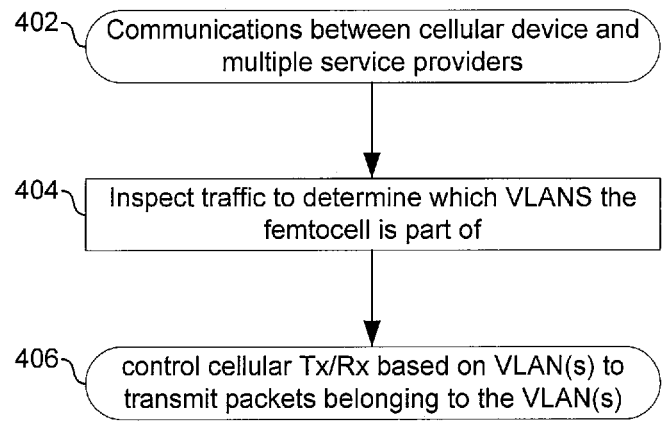
FIG. 4A is a flow chart illustrating exemplary steps for controlling a cellular Tx/Rx of a femtocell, in accordance with an embodiment of the invention.

FIG. 4A is a flow chart illustrating exemplary steps for controlling a cellular Tx/Rx of a femtocell, in accordance with an embodiment of the invention. Referring to FIG. 4A, the exemplary steps may begin with step 402 in which members of each of one or more VLANs may be communicatively coupled to a femtocell via a non-cellular connection and via a cellular connection. Subsequent to step 402, the exemplary steps may advance to step 404.

In step 404, the femtocell may identify the VLANs to which it is communicatively coupled by inspecting ingress and/or egress traffic at the cellular connection and the non-cellular connection. In some instances the femtocell may send test and/or control data to identify the one or more VLANs. Subsequent to step 406, the exemplary steps may advance to step 406.

In step 406, a cellular Tx/Rx of the femtocell may be controlled to enable transmitting and/or received packets belonging to the one or more VLANs. In this regard, the cellular Tx/Rx may be controlled to adhere to characteristics of the VLAN(s) such as cellular standards utilized, cellular channels utilized, an access technology utilized, and a duplexing method utilized. In this manner, the femtocell may support simultaneous, or seemingly simultaneous, communication of packets belonging to a plurality of VLANs each of which may utilize different cellular technologies.

Figure 4B:
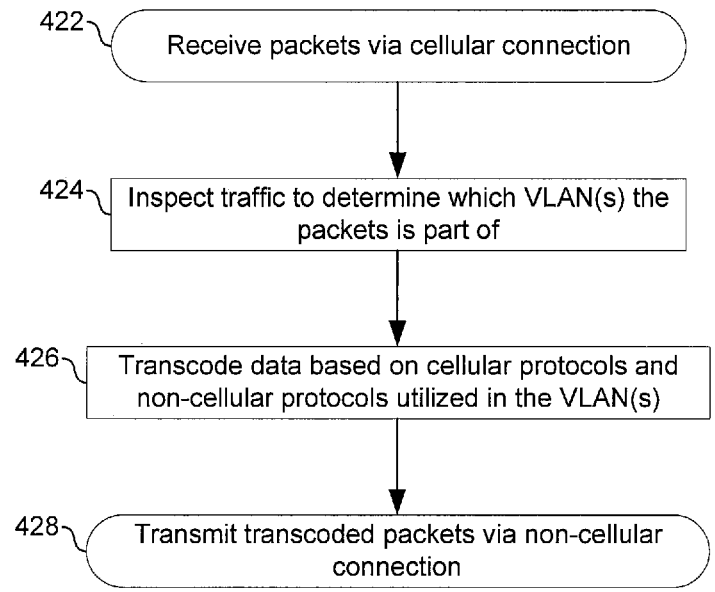
FIG. 4B is a flow chart illustrating forwarding of data in a VLAN by a femtocell, in accordance with an embodiment of the invention.

FIG. 4B is a flow chart illustrating forwarding of data in a VLAN by a femtocell, in accordance with an embodiment of the invention. Referring to FIG. 4B, the exemplary step may begin with step 422 in which one or more packets may be received in a femtocell via a cellular connection. Subsequent to step 422, the exemplary steps may advance to step 424.

In step 424, the received packets may be inspected to determine one or more VLAN(s) to which the packets belong. Additionally, the VLAN identifiers may be reference to a look-up table or other data structure to determine characteristics of the one or more VLAN(s). Subsequent to step 424, the exemplary steps may advance to step 426.

In step 426, the femtocell may transcode the packets based on the determined characteristics of the one or more VLAN(s). Subsequent to step 426, the exemplary steps may advance to step 428.

In step 428, the transcoded packets may be transmitted to one or more members of the one or more VLANs via a non-cellular connection to the femtocell, such as an Ethernet connection.

Figure 4C:
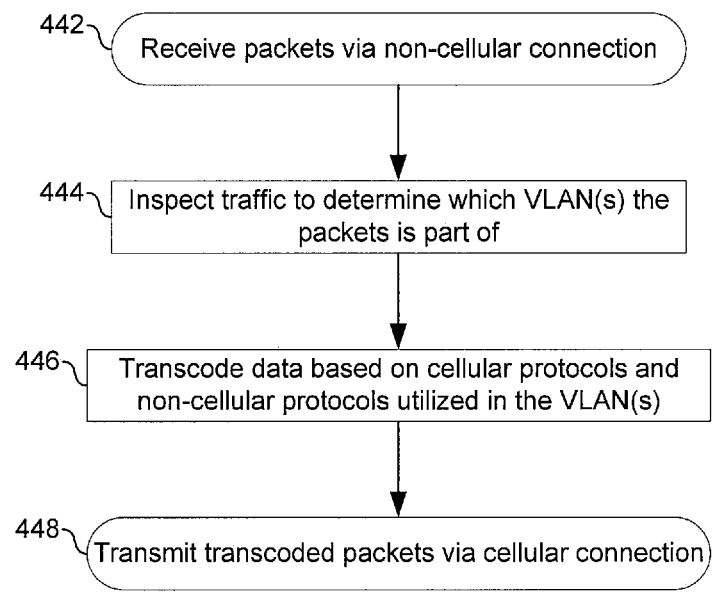
FIG. 4C is a flow chart illustrating forwarding of data in a VLAN by a femtocell, in accordance with an embodiment of the invention.

FIG. 4C is a flow chart illustrating forwarding of data in a VLAN by a femtocell, in accordance with an embodiment of the invention. Referring to FIG. 4C, the exemplary step may begin with step 442 in which one or more packets may be received in a femtocell via a non-cellular connection. Subsequent to step 442, the exemplary steps may advance to step 444.

In step 444, the received packets may be inspected to determine one or more VLAN(s) to which the packets belong. Additionally, the VLAN identifiers may be reference to a look-up table or other data structure to determine characteristics of the one or more VLAN(s). Subsequent to step 444, the exemplary steps may advance to step 426.

In step 446, the femtocell may transcode the packets based on the determined characteristics of the one or more VLAN(s). Subsequent to step 446, the exemplary steps may advance to step 448.

In step 448, the transcoded packets may be transmitted to one or more members of the one or more VLANs via a cellular connection to the femtocell. In an exemplary embodiment of the invention, a femtocell 110 (FIG. 2A) may determine characteristics of VLANs '1' and '2' to which it is virtually communicatively coupled via non-cellular connections 120*a* and 120*b* and via cellular connections 209*a* and 209*b*. Based on the determined characteristics of the VLANs '1' and '2', a cellular transmitter and/or receiver 154 (FIG. 3) of the femtocell 110 may be controlled and/or configured to transmit and/or receive packets belonging to the VLANs '1' and '2' via one or both of the non-cellular connections 120*a* and 120*b* and/or via one or both of the cellular connections 209*a* and 209*b*. The femtocell 110 may identify the VLANs '1' and '2' based on one or more VIDs recovered from packets processed in the femtocell 110. The characteristics of VLAN '1' and/or VLAN '2' may comprise one or more of: cellular standards utilized by VLAN '1' and/or VLAN '2', cellular frequencies utilized in VLAN '1' and/or VLAN '2', access technologies utilized by VLAN '1' and/or VLAN '2', and a duplexing method utilized by VLAN '1' and/or VLAN '2'. The one or more access technologies may comprise TDMA, FDMA, or CDMA and the duplexing methods may comprise TDD or FDD. The femtocell 110 may receive one or more packets via one or both of the non-cellular connections 120*a* and 120*b*, transcode the received packets based on the characteristics, and transmit the transcoded packets via the cellular transmitter and/or receiver 154 onto one or both of the cellular connections 209a and 209b.

The femtocell 110 may be operable to receive one or more packets via one or both of the cellular connections 209a and 209b, transcode the received packets based on the characteristics, and transmit the transcoded packets via the one or both of the non-cellular connections 120a and 120b. The one or more VLANs may be nested to enable packets to traverse multiple VLANs. The cellular transmitter and/or receiver 154 may be controlled dynamically to communicate in accordance with different cellular standards during different time intervals.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for supporting a plurality of providers via a single femtocell.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
in a femtocell that is operable to handle cellular enabled communication devices associated with a plurality of service providers:
determining a cellular provider associated with a cellular enabled communication device that is within range of said femtocell, wherein said determining is based on one or more virtual local area network identifiers (VIDs) recovered from packets received from said cellular enabled communication device without user input of said VIDs; and
controlling, based on said determined cellular provider, a configuration of a cellular transmitter and/or receiver of said femtocell that is utilized to communicate with said cellular enabled communication device via one or more cellular connections.

2. The method according to claim 1, comprising determining, in said femtocell, said cellular provider based on one or more virtual local area networking customer identifiers (CIDs) recovered from packets received from said cellular enabled communication device.

3. The method according to claim 2, comprising determining, based on said one or more VIDs or CIDs, one or more cellular standards utilized by said cellular enabled communication device.

4. The method according to claim 2, comprising determining, based on said one or more VIDs or CIDs, cellular frequencies utilized by said cellular enabled communication device.

5. The method according to claim 2, comprising determining, based on said one or more VIDs or CIDs, one or more access technologies utilized by said cellular enabled communication device, wherein said one or more access technologies comprises TDMA, FOMA, or COMA.

6. The method according to claim 2, comprising determining, based on said one or more VIDs or CIDs, a duplexing method utilized by said cellular enabled communication device, wherein said duplexing methods comprises TDD or FDD.

7. The method according to claim 1, comprising:
receiving one or more packets in said femtocell via one or more non-cellular connections;
transcoding said received packets based on said determined cellular provider; and
transmitting said transcoded packets to said cellular enabled communication device via said configured cellular transmitter and/or receiver.

8. The method according to claim 7, wherein said one or more VIDs are nested to enable data to traverse multiple VLANs.

9. The method according to claim 1, comprising:
receiving, in said femtocell, one or more packets from said cellular enabled communication device via said configured cellular transmitter and/or receiver;
transcoding said received packets based on said determined cellular provider; and
transmitting said transcoded packets via one or more non-cellular connections.

10. The method according to claim 9, wherein said one or more VIDs are nested to enable data to traverse multiple VLANs.

11. The method according to claim 1, comprising dynamically controlling said configuration of said cellular transmitter and/or receiver such that said cellular transmitter and/or receiver supports different cellular providers during different time intervals.

12. A system for networking, the system comprising:
one or more circuits for use in a femtocell that is operable to handle cellular enabled communication devices associated with a plurality of service providers, wherein said one or more circuits are operable to:
determine a cellular provider associated with a cellular enabled communication device that is within range of said femtocell, wherein said determining is based on one or more virtual local area network identifiers (VIDs) recovered from packets received from said cellular enabled communication device without user input of said VIDs; and control, based on said determined cellular provider, a configuration of a cellular transmitter and/or receiver of said femtocell that is utilized to communicate with said cellular enabled communication device via one or more cellular connections.

13. The system according to claim 12, wherein said one or more circuits are operable to determine said cellular provider based on one or more virtual local area networking customer identifiers (CIDs) recovered from packets received from said cellular enabled communication device.

14. The system according to claim 13, wherein said one or more circuits are operable to determine, based on said one or more VIDs or CIDs, one or more cellular standards utilized, by said cellular enabled communication device.

15. The system according to claim 13, wherein said one or more circuits are operable to determine, based on said one or more VIDs, or CIDs, cellular frequencies utilized by said cellular enabled communication device.

16. The system according to claim 13, wherein said one or more circuits are operable to determine, based on said one or more VIDs or CIDs, one or more access technologies utilized by said cellular enabled communication device, wherein said one or more access technologies, comprises TDMA, FDMA, or CDMA.

17. The system according to claim 13, wherein said one or more circuits are operable to determine, based on said one or more VIDs or CIDs, a duplexing method utilized by said cellular enabled communication device, wherein said duplexing method comprises TDD or FDD.

18. The system according to claim 12, wherein said one or more circuits are operable to:
receive one or more packets in said femtocell via one or more non-cellular connections;
transcode said received packets based on said determined cellular provider; and
transmit said transcoded packets to said cellular enabled communication device via said configured cellular transmitter and/or receiver.

19. The system according to claim 18, wherein said one or more VIDs are nested to enable data to traverse multiple VLANs.

20. The system according to claim 12, wherein said one or more circuits are operable to:
receive one or more packets from said cellular enabled communication device via said configured cellular transmitter and/or receiver;
transcode said received packets based on said determined cellular provider; and
transmit said transcoded packets via one or more non-cellular connections.

21. The system according to claim 20, wherein said one or more VIDs are nested to enable data to traverse multiple VLANs.

22. The system according to claim 21, wherein said one or more circuits are operable to dynamically control said configuration of said cellular transmitter and/or receiver such that said cellular transmitter and/or receiver supports different cellular providers during different time intervals.

* * * * *

UNITED STATES PATENT AND TRADEMARK OFFICE
CERTIFICATE OF CORRECTION

| | | |
|---|---|---|
| PATENT NO. | : 8,446,836 B2 | Page 1 of 1 |
| APPLICATION NO. | : 12/395383 | |
| DATED | : May 21, 2013 | |
| INVENTOR(S) | : Wael William Diab | |

It is certified that error appears in the above-identified patent and that said Letters Patent is hereby corrected as shown below:

In the Claims:

Column 14, Line 27, please replace "methods" with --method--.

Column 15, Line 14, please replace "utilized," with --utilized--.

Column 15, Line 18, please replace "VIDs," with --VIDs--.

Signed and Sealed this
Ninth Day of July, 2013

Teresa Stanek Rea
*Acting Director of the United States Patent and Trademark Office*